United States Patent
Ogawa et al.

[11] Patent Number: 5,609,135
[45] Date of Patent: Mar. 11, 1997

[54] CONTROL SYSTEM FOR INTERNAL COMBUSTION ENGINES

[75] Inventors: Ken Ogawa; Toshiyuki Nishida, both of Wako, Japan

[73] Assignee: Honda Giken Kogyo Kabushiki Kaisha, Tokyo, Japan

[21] Appl. No.: 658,076

[22] Filed: Jun. 4, 1996

[30] Foreign Application Priority Data

Jun. 15, 1995 [JP] Japan .................... 7-172912

[51] Int. Cl.⁶ .............. F02D 9/06; F02M 33/02
[52] U.S. Cl. .................... 123/325; 123/520
[58] Field of Search ............... 123/520, 521, 123/519, 518, 516, 357, 325, 326, 327, 339.17

[56] References Cited

U.S. PATENT DOCUMENTS

| | | | |
|---|---|---|---|
| 4,630,581 | 12/1986 | Shibata | 123/325 |
| 5,005,550 | 4/1991 | Bugin | 123/520 |
| 5,216,991 | 6/1993 | Iida | 123/519 |
| 5,272,873 | 12/1993 | Hamazaki | 123/520 |
| 5,469,832 | 11/1995 | Nemoto | 123/519 |
| 5,535,719 | 7/1996 | Morikawa | 123/520 |

FOREIGN PATENT DOCUMENTS

1-273863  11/1989  Japan .

*Primary Examiner*—Carl S. Miller
*Attorney, Agent, or Firm*—Nikaido, Marmelstein, Murray & Oram LLP

[57] ABSTRACT

A control system for an internal combustion engine determines whether or not at least one of fuel cut which is cutting-off of supply of fuel to the engine and decreased fuel supply which is supplying of fuel to the engine in a decreased amount for deceleration of the engine has been started, and whether or not purging of evaporative fuel into an intake passage of the engine by an evaporative emission control system of the engine was carried out within a first predetermined time period before the at least one of the fuel cut and the fuel supply reduction for deceleration of the engine has been started. The amount of auxiliary air supplied to the engine via a secondary intake air passage bypassing a throttle valve arranged in an intake passage of the engine is increased over a second predetermined time period after the at least one of the fuel cut and the decreased fuel supply for deceleration of the engine has been started.

6 Claims, 4 Drawing Sheets

CONTROL SYSTEM FOR INTERNAL COMBUSTION ENGINES

BACKGROUND OF THE INVENTION

1. Field of the Invention

This invention relates to a control system for internal combustion engines, and more particularly to a control system for an internal combustion engine equipped with an evaporative emission control system for temporarily storing evaporative fuel generated from a fuel tank and purging the same into an exhaust passage of the engine to thereby prevent evaporative fuel from being emitted into the atmosphere.

2. Prior Art

Conventionally, an internal combustion engine (hereinafter simply referred to as "the engine") is widely used which has a control system for controlling an evaporative emission control system for storing evaporative fuel generated from fuel containers, such as a fuel tank and a float chamber of a carburetor, in a canister charged with an adsorbent, such as activated carbon, when the engine is in stoppage, and introducing the stored evaporative fuel via a purging passage into an intake passage of the engine by utilizing negative pressure created within the intake passage (purging) when the engine is in operation, thereby allowing evaporative fuel to be consumed by the engine as part of fuel supplied thereto.

According to a control system of this kind, when a throttle valve of the engine is fully closed so that negative pressure drastically increases within the intake passage, the air-fuel ratio of a mixture supplied to a combustion chamber of the engine becomes excessively enriched because purged evaporative fuel remaining in the purging passage and the intake passage is supplied to the combustion chamber while the amount of intake air supplied to the combustion chamber is very small. On such an occasion, due to shortage of oxygen in exhaust gases from the engine, noxious components of the exhaust gases, such as HC and CO, cannot be fully purified by a three-way catalyst arranged in the exhaust passage, resulting in degraded exhaust emission characteristics of the engine.

To solve this problem, a control system has been proposed by Japanese Laid-Open Patent Publication (Kokai) No. 1-273863, which interrupts purging of evaporative fuel immediately when the throttle valve is fully closed, but continues supply of fuel by injection over a predetermined time period to allow purged evaporative fuel remaining in the intake system to be consumed by combustion in the combustion chamber, and then interrupts supply of fuel to the engine (fuel cut).

However, according to the proposed control system, the fuel supply by injection is continued over the predetermined time period after the throttle valve is fully closed, which leads to wasteful consumption of fuel and also degraded responsiveness of the engine operation to operation of the throttle valve.

SUMMARY OF THE INVENTION

It is an object of the invention to provide a control system for an internal combustion engine, which is capable of preventing degraded exhaust emission characteristics of the engine due to supply of purged evaporative fuel remaining in an intake passage of the engine etc. to the engine when the supply of fuel to the engine is cut off or when the fuel supply amount is decreased during deceleration of the engine, without incurring wasteful consumption of fuel and degraded driveability of the engine.

To attain the above object, the present invention provides a control system for an internal combustion engine having an intake passage, a throttle valve arranged in the intake passage, an exhaust passage, catalyst means arranged in the exhaust passage, for purifying exhaust gases emitted from the engine, and a fuel tank, the control system including evaporative emission control means for adsorbing evaporative fuel generated within the fuel tank for temporary storage in the evaporative emission control means, and for purging the evaporative fuel into the intake passage, a secondary intake air passage bypassing the throttle valve, secondary intake air control means arranged in the secondary intake air passage for controlling an amount of auxiliary air to be supplied to the engine through the secondary intake air passage, and fuel supply control means for controlling an amount of fuel to be supplied to the engine.

The control system according to the invention is characterized by comprising first determining means for determining whether or not at least one of fuel cut which is cutting-off of supply of fuel to the engine and decreased fuel supply which is supplying of fuel to the engine in a decreased amount for deceleration of the engine has been started by the fuel supply control means, and second determining means for determining whether or not purging of the evaporative fuel into the intake passage by the evaporative emission control means was carried out within a first predetermined time period before the at least one of the fuel cut and the decreased fuel supply for deceleration of the engine has been started, and wherein the secondary intake air control means increases the amount of auxiliary air over a second predetermined time period after the at least one of the fuel cut and the decreased fuel supply for deceleration of the engine has been started.

Preferably, the control system includes rotational speed-detecting means for detecting rotational speed of the engine. The secondary intake air control means determines the second predetermined time period according to the rotational speed of the engine detected by the rotational speed-detecting means.

More specifically, the second predetermined time period is set to a longer time period as the rotational speed of the engine is lower.

Also preferably, the first predetermined time period is set to a time period which is required to elapse before the evaporative fuel purged by the evaporative emission control means but remaining within the evaporative emission control system and the intake passage to be emitted into the exhaust passage immediately after the purging of the evaporative fuel into the intake passage is terminated.

Preferably, the control system includes evaporative fuel amount-detecting means for detecting an amount of evaporative fuel purged into the intake passage by the evaporative emission control means. The secondary intake air control means increases the amount of auxiliary air according to the amount of evaporative fuel detected by the evaporative fuel amount-detecting means.

More specifically, the amount of auxiliary air is set to a larger value as the amount of evaporative fuel detected by the evaporative fuel amount-detecting means is larger.

The above and other objects, features, and advantages of the invention will become more apparent from the following detailed description taken in conjunction with the accompanying drawings.

DETAILED DESCRIPTION

The invention will now be described in detail with reference to the drawings showing an embodiment thereof.

Figure 1:
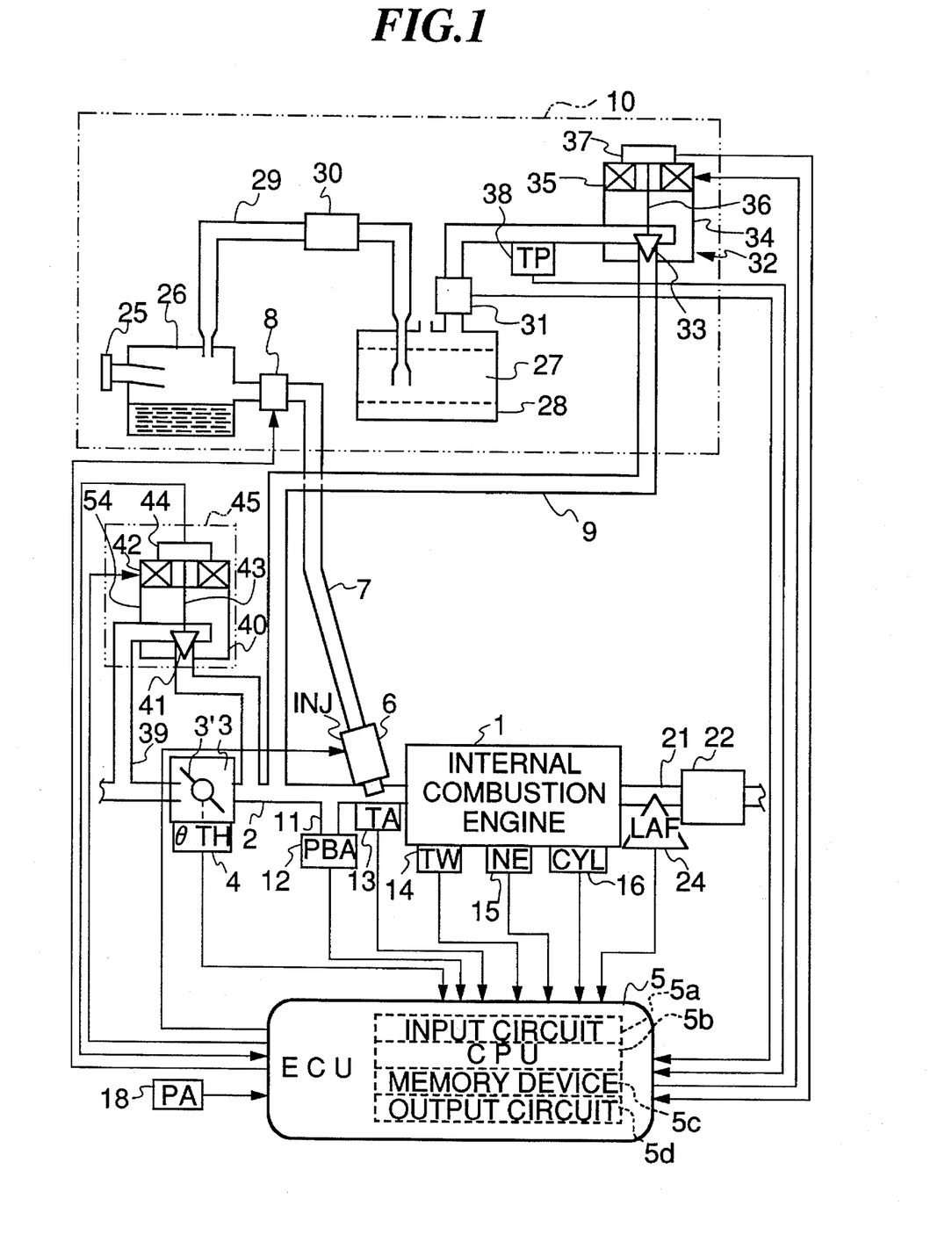
FIG. 1 is a block diagram showing the whole arrangement of an internal combustion engine incorporating a control system according to an embodiment of the invention.

Referring first to FIG. 1, there is shown the whole arrangement of an internal combustion engine (hereinafter simply referred to as "the engine"), which is a DOHC straight type four-cylinder, for example, and a control system therefor according to an embodiment of the invention. Connected to intake ports, not shown, of the cylinder block of the engine is an intake pipe 2 across which is arranged a throttle body 3 accommodating a throttle valve 3' therein. A throttle valve opening ($\theta$TH) sensor 4 is connected to the throttle valve 3', for generating an electric signal indicative of the sensed throttle valve opening $\theta$TH and supplying the same to an electronic control unit (hereinafter referred to as "the ECU") 5.

Fuel injection valves 6, only one of which is shown, are inserted into the intake pipe 2 at locations intermediate between the cylinder block of the engine 1 and the throttle valve 3' and slightly upstream of respective corresponding intake valves, not shown. The fuel injection valves 6 are connected to a fuel pump 8 via a fuel supply pipe 7, and electrically connected to the ECU 5 to have their valve opening periods controlled by signals therefrom.

At a location slightly downstream of the throttle valve 3', a purging passage 9 branches off the intake pipe 2 and forms part of an evaporative emission control system 10, described hereinafter.

On the other hand, an intake pipe absolute pressure (PBA) sensor 12 is provided in communication with the interior of the intake pipe 2 via a conduit 11 at a location downstream of the purging passage 9, for supplying an electric signal indicative of the sensed absolute pressure PEA within the intake pipe 2 to the ECU 5. An intake air temperature (TA) sensor 13 is inserted into the intake pipe 2 at a location downstream of the conduit 11, for supplying an electric signal indicative of the sensed intake air temperature TA to the ECU 5.

An engine coolant temperature (TW) sensor 14, which may be formed of a thermistor or the like, is mounted in the cylinder block of the engine 1, for supplying an electric signal indicative of the sensed engine coolant temperature TW to the ECU 5. An engine rotational speed (NE) sensor 15 and a cylinder-discriminating (CYL) Sensor 16 are arranged in facing relation to a camshaft or a crankshaft of the engine 1, neither of which is shown. The engine rotational speed (NE) sensor 15 generates a pulse (hereinafter referred to as "the TDC signal pulse") at a predetermined crank angle position of each cylinder a predetermined angle before a TDC position of the cylinder corresponding to the start of the intake stroke thereof whenever the crankshaft rotates through 180 degrees, while the CYL sensor 16 generates a pulse (hereinafter referred to as "the CYL signal pulse") at a predetermined crank angle position of a particular cylinder of the engine a predetermined angle before a TDC position of the cylinder corresponding to the start of the intake stroke thereof. The TDC signal pulse and the CYL signal pulse are supplied to the ECU 5.

An atmospheric pressure (PA) sensor 18 is arranged at a suitable location of the engine 1 for supplying a signal indicative of the sensed atmospheric pressure PA to the ECU 5.

A catalytic converter (three-way catalyst) 22 is arranged within an exhaust pipe 21 connected to exhaust ports, not shown, of the cylinder block of the engine 1, for purifying noxious components such as HC, CO, and NOx.

A linear output type air-fuel ratio sensor (hereinafter referred to as "the LAF sensor") 24 is arranged in the exhaust pipe 21 at a location upstream of the catalytic converter 22. The LAF sensor 24 supplies an electric signal which is substantially proportional to the concentration of oxygen present in exhaust gases to the ECU 5.

The evaporative emission control system 10 is comprised of a fuel tank 26 with a filler cap 25 which is opened or removed when the fuel tank 26 is refueled, a canister 28 which accommodates adsorbent 27 formed of activated carbon, for adsorbing evaporative fuel from the fuel tank 26, an evaporative fuel passage 29 connecting between the canister 28 and the fuel tank 26, and a two-way valve 30 arranged in the evaporative fuel passage 29, which is formed of a positive pressure valve and a negative pressure valve, neither of which is shown.

The evaporative emission control system 10 further includes a hot-wire type flowmeter (hereinafter simply referred to as "the flowmeter") 31 arranged in the purging passage 9, which extends from the canister 28 to the intake pipe 2, at a location in the vicinity of the canister 28, and a purge control valve 32 arranged in the purging passage 9 at a location downstream of the flowmeter 31.

The flowmeter 31 has a platinum wire, not shown, which is heated by electric current and cooled by a gas flowing in the purging passage 9 to have its electrical resistance reduced. The flowmeter 31 has an output characteristic variable in dependence on the concentration and flow rate of evaporative fuel being purged through the purging passage 9. The flowmeter 31 is electrically connected to the ECU 5 for supplying an electric signal dependent on variations in the concentration and flow rate of evaporative fuel being purged through the purging passage 9.

The purge control valve 32 is an electromagnetic valve of a normally closed-type which is comprised of a casing 34, a valve element 33 in the form of a wedge received within the casing 34 for vertical motion to open and close the purging passage 9, a valve stem 36 having the valve element 33 fixed at one end thereof, a solenoid 35 for lifting the valve element 33 via the valve stem 36, and a valve opening (lift) sensor (hereinafter referred to as "the PRG lift sensor") 37 connected to the valve element 33 via the valve stem 36. The solenoid 35 is electrically connected to the ECU 5 to have its operation duty-controlled by a signal therefrom for setting a valve lift amount of the valve element 33. The PRG lift sensor 37 detects the valve lift amount of the valve element 33 to supply an electric signal indicative of the detected valve lift amount to the ECU 5.

Also arranged in the purging passage 9 is a purge temperature (TP) sensor 38 at a location between the flowmeter 31 and the purge control valve 32. The TP sensor 38 is electrically connected to the ECU 5 and supplies a signal indicative of the sensed temperature of purged evaporative .fuel (purge temperature) TP to the ECU 5.

The throttle body 3 arranged across the intake pipe 2 is bypassed by an auxiliary air passage 39 in which is arranged an auxiliary air amount control valve (hereinafter referred to as "the EACV") 40. The auxiliary air passage 39 and the auxiliary air amount control valve 40 form a secondary intake air control device 45.

The EACV 40 is comprised of a casing 54, a valve element 41 in the form of a wedge received within the casing 54 for vertical motion to open and close the auxiliary air passage 39, a valve stem 43 having the valve element 41 fixed at one end thereof, a solenoid 42 for lifting the valve element 41 via the valve stem 43, and a valve opening (lift) sensor 44 connected to the valve element 41 via the valve stem 43. The solenoid 42 is electrically connected to the ECU 5 to have its operation controlled by a signal therefrom for setting a valve lift amount of the valve element 41. The lift sensor 44 detects the valve lift amount of the valve element 41 to supply an electric signal indicative of the detected valve lift amount to the ECU 5.

The secondary intake air control device 45 supplies auxiliary air to the engine to control the engine rotational speed during idling of the engine. In the present embodiment, however, the secondary intake air amount control device 45 is also utilized to prevent degradation of exhaust emission characteristics of the engine during fuel cut, as described in detail hereinafter.

The ECU 5 is comprised of an input circuit 5a having the functions of shaping the waveforms of input signals from various sensors, shifting the voltage levels of sensor output signals to a predetermined level, converting analog signals from analog output sensors to digital signals, and so forth, a central processing unit (hereinafter referred to as "the CPU") 5b, a memory device 5c (including a ring buffer, not shown) storing various operational programs which are executed by the CPU 5b, and for storing results of calculations therefrom, etc., and an output circuit 5d which outputs driving signals to the fuel injection valves 6, the fuel pump 8, the solenoids 35 and 42, etc.

Figure 2:
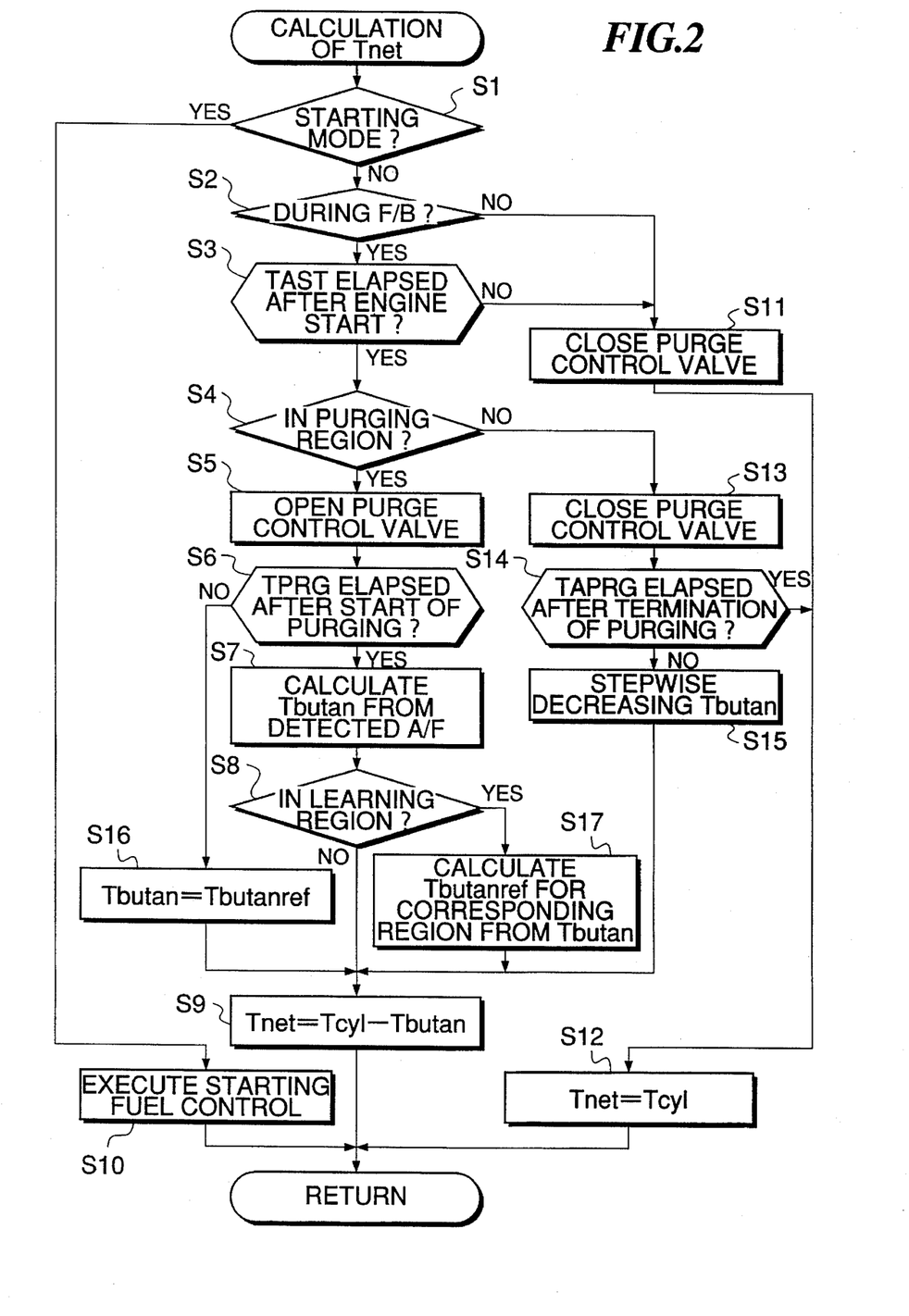
FIG. 2 is a flowchart showing a routine for calculating a net fuel amount Tnet.

FIG. 2 shows a routine for calculating a net fuel amount Tnet to be supplied to the engine 1, which is executed in synchronism with generation of each TDC signal pulse.

First, at a step S1, it is determined whether or not the engine is in a starting mode. The determination as to whether the engine is in the starting mode is carried out by determining whether or not a starter switch, not shown, of the engine 1 is ON, and at the same time the engine rotational speed NE is below a predetermined starting reference value (cranking rotational speed).

If the engine is in the starting mode, normal fuel supply control in the starting mode is executed at a step S10, followed by terminating the program. On the other hand, if the engine is not in the starting mode, the program proceeds to a step S2.

At the step S2, it is determined whether or not air-fuel ratio feedback control responsive to an output from the LAF sensor 24 is being carried out. If it is determined that the air-fuel ratio feedback control is not being carried out, the purge control valve 32 of the evaporative emission control system is closed to inhibit purging of evaporative fuel at a step S11. Then, at a step S12, a net fuel injection period Tnet is set to a required fuel injection period Tcyl, followed by terminating the present routine. Since "a fuel injection period" over which the fuel injection valve 6 is to be opened is equivalent to "an amount of fuel injected over the fuel injection period", the net fuel injection period Tnet and the required fuel injection period Tcyl will be hereinafter referred to as "the net fuel amount Tnet" and "the required fuel amount Tcyl", respectively. The required fuel amount Tcyl is calculated by the use of the following equation (1):

$$Tcyl = TiM \times KTOTAL \times KLAF \qquad (1)$$

where TiM represents a basic fuel amount determined in accordance with the engine rotational speed NE and the intake pipe absolute pressure PBA, KLAF an air-fuel ratio correction coefficient which is set based on the output from the LAF sensor 24 during the air-fuel ratio feedback control such that the air-fuel ratio of a mixture supplied to the engine detected by the LAF sensor 24 becomes equal to a desired air-fuel ratio, and set to a predetermined value (e.g. 1.0) when the air-fuel ratio feedback control is not being carried out, and KTOTAL the product of various correction coefficients (excluding the air-fuel ratio correction coefficient KLAF) which are determined based on engine operating parameters, such as the engine coolant temperature TW, the intake air temperature TA, and the atmospheric pressure PA, and a deceleration-dependent leaning correction coefficient KLS for decreasing the fuel supply amount during deceleration of the engine (which is set to 1.0 when the engine is not decelerating).

On the other hand, if it is determined at the step S2 that the air-fuel ratio feedback control is being carried out, the program proceeds to a step S3, wherein it is determined whether or not a predetermined time period TAST has elapsed after the engine 1 was started. The predetermined time period TAST is set at such a sufficient time period, e.g. one minute, within which the operating condition of the engine 1 can be stabilized. Further, the predetermined time period TAST is preferably set according to the engine coolant temperature TW. If it is determined at the step S3 that the predetermined time period TAST has not elapsed, the program proceeds to the step S11, wherein the purge control valve 32 is kept closed to stabilize the operating condition of the engine.

On the other hand, if it is determined at the step S3 that the predetermined time period TAST has elapsed after the engine was started, the program proceeds to a step S4, wherein it is determined whether or not the engine is in a purging region where evaporative fuel should be purged. The purging region is an engine operating region which does not satisfy at least a condition that fuel cut should be carried out, for example, i.e. the throttle valve 3 is fully closed and at the same time the engine rotational speed NE exceeds a predetermined value (higher than the idling speed).

Further, the purging region is required to satisfy a condition that the engine rotational speed NE and the engine coolant temperature TW, for example, fall within respective predetermined ranges. When the fuel supply amount is decreased during deceleration of the engine (KLAN≠1.0), the purging of evaporative fuel is inhibited.

If it is determined at the step S4 that the engine 1 is in the purging region, the program proceeds to a step S5, wherein opening control of the purge control valve 32 is executed by another routine, not shown. In the opening control of the purge control valve 32, a desired purging amount of evaporative fuel is determined by retrieving a map, not shown, according to the engine rotational speed NE, the intake pipe absolute pressure PBA, etc., and the purge control valve 32 is duty-controlled based on the determined desired purging amount. The opening control of the purge control valve 32 may be executed by the use of a plurality of purge control valves. For example, a plurality of passages with respective different inner diameters may be provided as the purging passage 9 between the canister 28 and the intake pipe 2, and a solenoid valve arranged in each of the passages may be opened and closed.

Then, the program proceeds to a step S6, wherein it is determined whether or not a predetermined time period TPRG has elapsed after the engine entered the purging region.

If it is determine at the step S6 that the predetermined time period TPRG has elapsed after the engine entered the purging region, the program proceeds to a step S7, wherein the amount of evaporative fuel to be purged (purged fuel amount) is converted to a fuel injection period to obtain a converted value Tbutan. The converted value Tbutan will be hereinafter referred to as the purged fuel amount Tbutan, since the fuel injection period is equivalent to an amount of evaporative fuel purged over the fuel injection period.

The predetermined time period TPRG is set at such a sufficient time period (corresponding e.g. to a time period of generation of 20 TDC signal pulses) within which purged evaporative fuel can be introduced into the intake pipe 2, burned in the combustion chamber, emitted into the exhaust pipe 21 as part of exhaust gases, and the resulting air-fuel ratio of the exhaust gases is detected by the LAF sensor 27.

At the step S7, the purged fuel amount Tbutan is detected by utilizing the fact that the detected air-fuel ratio deviates to a value richer than the desired air-fuel ratio when the purged evaporative fuel is added to the fuel supplied by injection. More specifically, the difference between the air-fuel ratio detected by the LAF sensor 24 and the desired air-fuel ratio is determined, and the amount of evaporative fuel is calculated from the difference assuming that the difference is totally ascribable to an amount of butane contained in the purged gas, while taking into account the difference between a stoichiometric air-fuel ratio (15.5) of butane and a stoichiometric air-fuel ratio (14.7) of gasoline.

Then, the calculated amount of evaporative fuel is converted to a fuel injection period over which the fuel injection valve 6 is to be opened, to obtain the purged fuel amount Tbutan.

Further, in calculating the purged fuel amount Tbutan, an amount of fuel adhering to the inner wall surfaces of the purging passage 9 and the intake pipe 9 and an amount of fuel carried from the inner wall surfaces by evaporation into the combustion chamber may be estimated, to correct the purged fuel amount Tbutan by these estimated values. Further preferably, dynamic characteristics of evaporative fuel purged from the canister, such as a time lag in transport of fuel to the combustion chamber may be taken into account, as disclosed in Japanese Laid-Open Patent Publication (Kokai) No. 6-101522.

Alternatively, the purged fuel amount Tbutan may be determined by using an output from the flowmeter 31 in a conventional manner instead of using the output from the LAF sensor 24.

Then, it is determined at a step S8 whether or not the engine 1 is in a learning region in which an initial value Tbutanref of the purged fuel amount Tbutan to be applied immediately after the engine enters the purging region should be learned. This determination is carried out by comparing the engine rotational speed NE, the intake pipe absolute pressure temperature PBA, the engine coolant temperature TW, etc. with respective predetermined values, as well as determining whether or not the engine is in an idling region.

If it is determined at the step S8 that the engine is not in the learning region, the program proceeds to a step S9, wherein the purged fuel amount Tbutan calculated at the step S7 is subtracted from the required fuel amount Tcyl to determine the net fuel amount Tnet, followed by terminating the program.

On the other hand, if it is determined at the step S8 that the engine is in the learning region, the program proceeds to a step S17, wherein the initial value Tbutanref is calculated based on the purge fuel amount Tbutan calculated at the step S7, followed by the program proceeding to the step S9. In calculating the initial value Tbutanref, the learning region is divided into a plurality of regions according to the engine rotational speed NE, the intake pipe absolute pressure PBA, the engine coolant temperature TW, etc. Especially, the engine coolant temperature TW has much influence on the concentration of purged evaporative fuel. Then, the initial value Tbutanref is learned region by region by the use of an averaging coefficient which is set for each of the divided regions which belongs to the engine operating condition and the learned value is stored. This makes it possible to obtain the optimum Tbutanref value to be applied immediately after the engine enters the purging region.

On the other hand, if it is determined at the step S6 that the predetermined time period TPRG has not elapsed, the program proceeds to a step S16, wherein the purged fuel amount Tbutan is set to the initial value Tbutanref calculated at the step S17, whereby it is possible to properly carry out the fuel supply control before the purging of evaporative fuel actually influences the air-fuel ratio of exhaust gases immediately after the engine has entered the purging region, when the purged fuel amount Tbutan cannot be properly determined from the air-fuel ratio ratio of exhaust gases. Further, dynamic characteristics of the purged evaporative fuel may be taken into account such that the initial value Tbutanref is progressively changed with the lapse of time. Then, the program proceeds to the step S9 to calculate the net fuel amount Tnet by subtracting the purged fuel amount Tbutan set at the step S16 from the required fuel amount Tcyl, followed by terminating the program.

On the other hand, if it is determined at the step S4 that the engine is not in the purging region, the purge control valve 32 is closed at a step S13, and then the program proceeds to a step S14.

At the step S14, it is determined whether or not a predetermined time period TAPRG has elapsed after the purging of evaporative fuel was terminated. If the predetermined time period TAPRG has elapsed, the program proceeds to the step S12 to set the net fuel amount Tnet to the required fuel amount Tcyl, followed by terminating the program, whereas if the predetermined time period TAPRG has not elapsed, the program proceeds to a step S15.

The predetermined time period TAPRG is set at such a sufficient time period (e.g. 0.5 sec.) within which purged evaporative fuel remaining within the purging passage 9 and the intake pipe 2 can be fully emitted into the exhaust pipe 21 immediately after the purging of evaporative fuel is terminated.

At the step S15, the purged fuel amount Tbutan is calculated by stepwise decreasing the same. More specifically, the purged fuel amount Tbutan calculated and applied in calculation of the net fuel amount Tnet during the purging is progressively decreased to 0 with the lapse of time after the purging of evaporative fuel is terminated. By thus progressively decreasing the purged fuel amount Tbutan, the purged fuel amount Tbutan can incessantly assume values corresponding to a change in the concentration of the purged evaporative fuel remaining within the intake system with the lapse of time immediately after the purge control valve 32 is closed.

After the purged fuel amount Tbutan is calculated, the program proceeds to the step S9, wherein the purged fuel Tbutan is subtracted from the required fuel amount Tcyl to obtain the net fuel amount Tnet, followed by terminating the present routine.

According to the FIG. 2 routine described above, during execution of purging of evaporative fuel and before the lapse of the predetermined time period TAPRG after termination of the purging, the required fuel amount Tcyl is corrected by the purged fuel amount Tbutan, which makes it possible to properly control the air-fuel ratio of the mixture supplied to the engine during and immediately after purging of evaporative fuel.

Next, a manner of calculating a secondary intake air control amount ICMD controlled by the secondary intake air control device 45 will be described. The control amount ICMD is a current value to be supplied to the EACV 40 to open the same such that as the control amount ICMD increases, the valve lift amount of the EACV 40 increases to increase the amount of auxiliary air.

Figure 3:
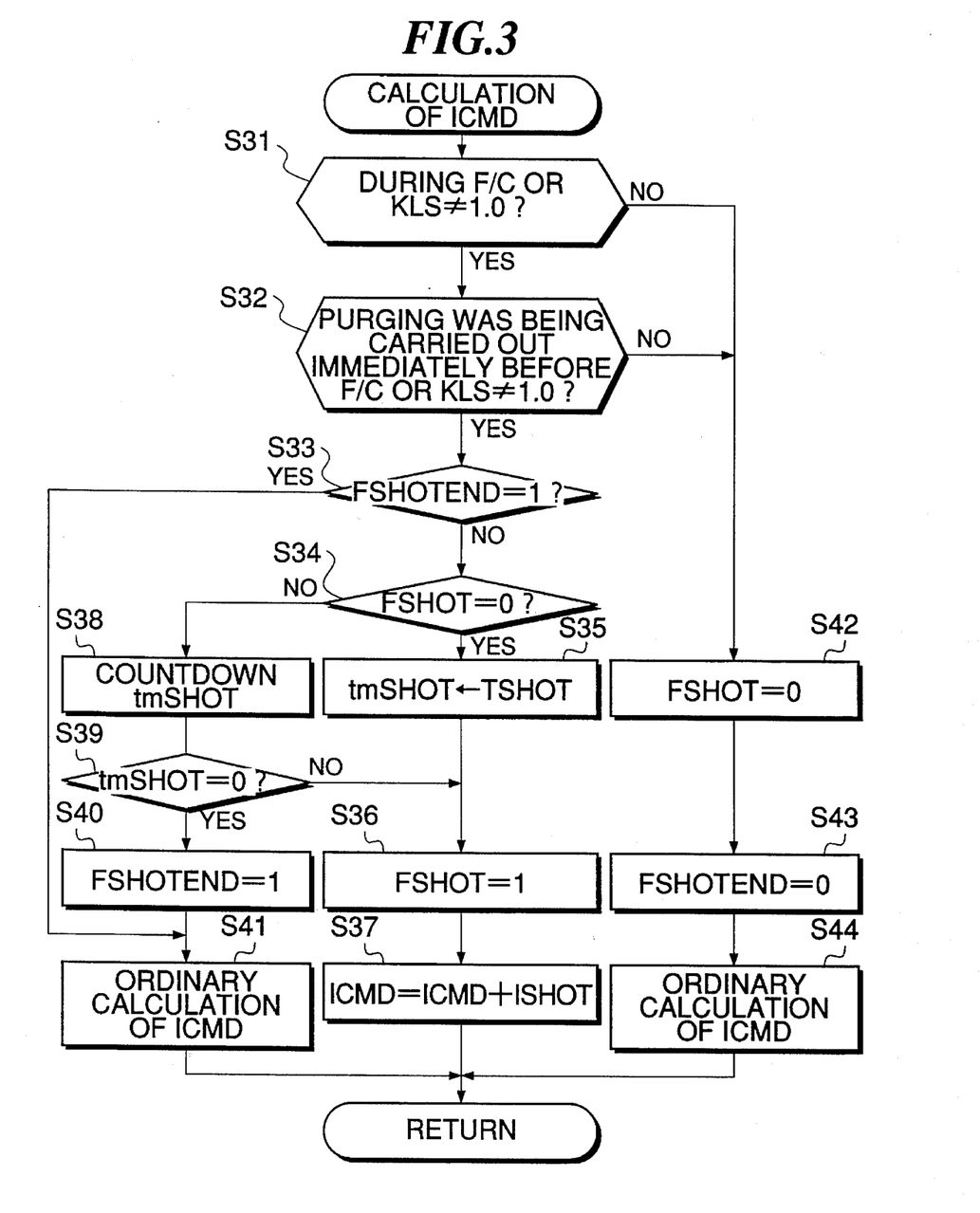
FIG. 3 is a flowchart showing a routine for calculating a control amount ICMD for the amount of secondary intake air (auxiliary air) supplied to the engine.

FIG. 3 shows a routine for calculating the secondary intake air (auxiliary air) control amount ICMD, which is executed in synchronism with generation of each TDC signal pulse or at predetermined time intervals.

First, at a step S31, it is determined whether or not the engine 1 is in a fuel cut (F/C) condition or a decreased fuel supply condition during deceleration (KLS≠1.0).

The determination as to whether or not the engine 1 is in a fuel cut (F/C) condition or a decreased fuel supply condition during deceleration (KLS≠1.0) is carried out based on the engine rotational speed NE and the throttle valve opening θTH by executing a fuel cut condition-determining routine, not shown, and a decreased fuel supply condition-determining routine, not shown.

If it is determined at the step S31 that the engine 1 is in neither the fuel cut (F/C) condition nor the decreased fuel supply condition during deceleration, a flag FSHOT, which, when set to "1", indicates that the auxiliary air is being supplied in an increased amount by the present routine (auxiliary air amount-increasing control), is set to "0" at a step S42, and a flag FSHOTEND, which, when set to "1", indicates that the auxiliary air amount-increasing control is being carried out, is set to "0" at a step S43. The, the program proceeds to a step S44, wherein the control amount ICMD is calculated in an ordinary manner (e.g. according to the engine rotational speed NE), followed by terminating the present routine.

On the other hand, if it is determined at the step S31 that the engine 1 is in the fuel cut (F/C) condition or the decreased fuel supply condition during deceleration (KLS≠1.0), the program proceeds to a step S32, wherein it is determined whether or not the purging of evaporative fuel was carried out immediately before the start of the present fuel cut or the present decreased fuel amount supply during deceleration, that is, whether or not fuel cut (F/C) or the decreased fuel amount supply during deceleration was started when the purging of evaporative fuel was being carried out or before the predetermined time period TAPRG elapsed after termination of the purging of evaporative fuel.

If it is determined at the step S32 that the purging of evaporative fuel was not carried out immediately before the start of the present fuel cut (F/C) or the present decreased fuel supply during deceleration, the control amount ICMD need not be corrected, and therefore the program proceeds to the step S42.

On the other hand, if it is determined at the step S32 that the purging of evaporative fuel was carried out before the start of the fuel cut (F/C) or the supply of the decreased amount of fuel supply during deceleration, the program proceeds to a step S33, wherein it is determined whether or not the flag FSHOTEND assumes "1".

Immediately after fuel cut (F/C) or the decreased fuel supply during deceleration is started, the flag FSHOTEND should assume "0", so that the program proceeds to a step S34, wherein it is determined whether or not the flag FSHOT assumes "0". Immediately after the fuel cut (F/C) or the decreased fuel supply during deceleration is started, the flag FSHOT also should assume "0", so that the program proceeds to a step S35, wherein a predetermined time period TSHOT is set to a downcounting timer tmSHOT to start the same to measure the predetermined time period TSHOT over which an increased amount of auxiliary air is to be supplied. The predetermined time period TSHOT is determined by retrieving a table shown in FIG. 4 according to the engine rotational speed NE, and by interpolation, if required, such that the lower the engine rotational speed NE, the longer the predetermined time period TSHOT. This makes it possible to supply the auxiliary air in such a suitable amount as compensates for the flow rate of intake air which varies with the engine rotational speed NE.

Then, the flag FSHOT is set to "1" at a step S36, and an addend control amount ISHOT is added to a value of the control amount ICMD calculated in the ordinary manner to correct the control amount ICMD, followed by terminating the present routine.

Thus, the auxiliary air is supplied to the engine in an increased amount compared with an ordinary amount, to make leaner the air-fuel ratio of the mixture in the intake system, which has been on the rich side due to purged evaporative fuel remaining in the intake system. This enables the three-way catalyst 22 to fully purify noxious components of exhaust gases, such as HC and CO.

Figure 5:
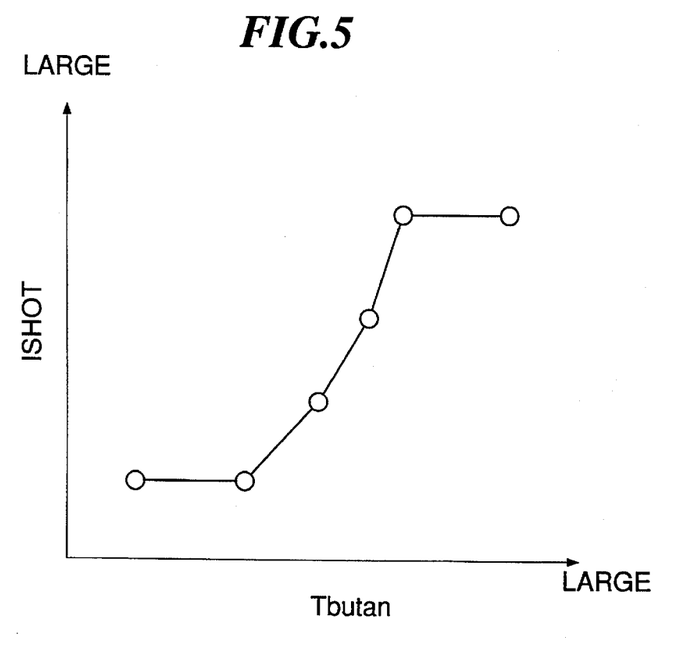
FIG. 5 shows a table for determining an addend control amount ISHOT for increasing the amount of secondary intake air.

The addend control amount ISHOT is determined by retrieving a table shown in FIG. 5 according to the final value of the purged fuel amount Tbutan as the fuel injection period-converted value calculated by the FIG. 2 routine, and by interpolation, if required, such that the larger the final value of the purged fuel amount Tbutan, the larger the addend control amount ISHOT. This makes it possible to supply the auxiliary air in an amount corresponding to the concentration of purged evaporative fuel remaining within the intake system of the engine.

In the next loop of execution of the present routine, FSHOT=1 holds at the step S34, so that the program proceeds to a step S38, wherein the timer tmSHOT set at the step S35 is caused to make downcounting. The downcounting of the timer tmSHOT is carried out by decrementing the count of the timer tmSHOT at predetermined time intervals of e.g. 10 msec.

Then, the program proceeds to a step S39, where it is determined whether or not the count of the timer tmSHOT is equal to "0".

When this step is first executed, tmSHOT>0 holds, so that the steps S36 and S37 are executed to continue correcting the control amount ICMD by adding the addend control amount ISHOT thereto, followed by terminating the present routine.

When the predetermined time period TSHOT has elapsed so that tmSHOT=0 holds at the step S39, the program proceeds to a step S40, wherein the flag FSHOTEND is set to "1" to calculate the control amount ICMD in the ordinary manner at a step S41, followed by terminating the present routine.

In the next loop of execution of the present routine, FSHOTEND=1 holds, so that the program proceeds from the step S33 to the step S41.

As described above, according to the FIG. 3 routine, if the purging of evaporative fuel was executed immediately before the start of the fuel cut (F/C) or the decreased fuel supply during deceleration (KLS≠1.0), the auxiliary air is supplied in an increased amount over the predetermined time period TSHOT after execution of the fuel cut or the decreased fuel supply during deceleration is started, As a result, it is possible to prevent the air-fuel ratio of the mixture supplied to the engine from being undesirably enriched due to purged evaporative fuel remaining within the intake system immediately after the start of the fuel cut (F/C) or the decreased fuel supply during deceleration, thereby maintaining excellent exhaust emission characteristics of the engine on such an occasion.

Next, an outline of a manner of calculating a fuel injection amount (final amount) Tout, which is executed by another routine, not shown, will be described.

The fuel injection amount Tout is calculated by the use of the following equation (2):

$$Tout = Tnet + TTOTAL + TV \qquad (2)$$

where TTOTAL represents the sum of all addend correction variables which are determined based on engine operating parameter signals from various sensors, and TV a so-called ineffective time period of the fuel injection valve 6, which is not included in the TTOTAL value.

The net fuel amount Tnet is calculated in the afore-described manner, e.g. by subtracting the purged fuel amount Tbutan from the required fuel amount Tcyl (steps S9 and S12 in FIG. 2).

Thus, the net fuel amount Tnet is calculated in a manner dependent upon execution of purging of evaporative fuel as well as upon the possible amount of purged evaporative fuel remaining in the intake system, etc., which makes it possible to supply the optimum amount of fuel by injection to the engine.

Although in the above described embodiment, the purged fuel amount Tbutan is calculated and subtracted from the required fuel amount Tcyl for correction of the fuel injection amount Tout, this is not limitative, but, for example, a correction coefficient Kbutan (≦1.0) may be calculated according to the difference between the detected air-fuel ratio and the desired air-fuel ratio, and the net fuel amount Tnet may be obtained by multiplying the required fuel amount Tcyl by the correction coefficient Kbutan to thereby carry out purging-dependent correction of the fuel supply amount.

Figure 4:
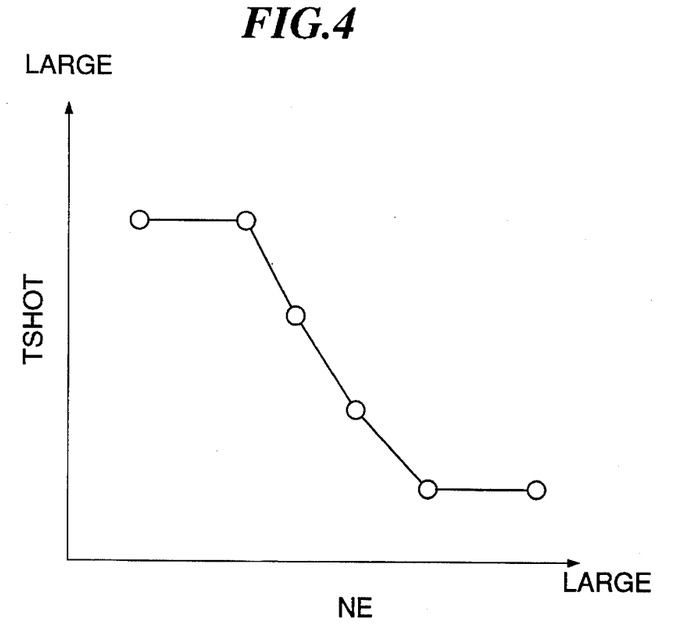
FIG. 4 shows a table for determining a predetermined time period TSHOT to be set to a downcount timer TmSHOT.

Further, although in the above described embodiment, the predetermined time period TSHOT to be set to the timer tmSHOT in the FIG. 3 routine is determined according to the engine rotational speed NE as shown in FIG. 4, and the timer tmSHOT is caused to make downcounting of the predetermined time period TSHOT at predetermined time intervals, this is not limitative, but, for example, the predetermined time period TSHOT may be set to an almost fixed value, and the timer tmSHOT may be caused to count down the predetermined time period TSHOT in synchronism with generation of each TDC signal pulse.

What is claimed is:

1. In a control system for an internal combustion engine having an intake passage, a throttle valve arranged in said intake passage, an exhaust passage, catalyst means arranged in said exhaust passage, for purifying exhaust gases emitted from said engine, and a fuel tank, said control system including evaporative emission control means for adsorbing evaporative fuel generated within said fuel tank for temporary storage in said evaporative emission control means, and for purging said evaporative fuel into said intake passage, a secondary intake air passage bypassing said throttle valve, secondary intake air control means arranged in said secondary intake air passage for controlling an amount of auxiliary air to be supplied to said engine through said secondary intake air passage, and fuel supply control means for controlling an amount of fuel to be supplied to said engine, the improvement comprising first determining means for determining whether or not at least one of a fuel cut which is cutting-off of supply of fuel to said engine and decreased fuel supply which is supplying of fuel to said engine in a decreased amount for deceleration of said engine has been started by said fuel supply control means, and second determining means for determining whether or not purging of said evaporative fuel into said intake passage by said evaporative emission control means was carried out within a first predetermined time period before said at least one of said fuel cut and said decreased fuel supply for deceleration of said engine has been started, and wherein said secondary intake air control means increases said amount of auxiliary air over a second predetermined time period after said at least one of said fuel cut and said decreased fuel supply for deceleration of said engine has been started.

2. A control system according to claim 1, including rotational speed-detecting means for detecting rotational speed of said engine, and wherein said secondary intake air control means determines said second predetermined time period according to said rotational speed of said engine detected by said rotational speed-detecting means.

3. A control system according to claim 2, wherein said second predetermined time period is set to a longer time period as said rotational speed of said engine is lower.

4. A control system according to claim 1, wherein said first predetermined time period is set to a time period which is required to elapse before said evaporative fuel purged by said evaporative emission control means but remaining within said evaporative emission control system and said intake passage to be emitted into said exhaust passage immediately after said purging of said evaporative fuel into said intake passage is terminated.

5. A control system according to claim 1, including evaporative fuel amount-detecting means for detecting an amount of evaporative fuel purged into said intake passage by said evaporative emission control means, and wherein said secondary intake air control means increases said amount of auxiliary air according to said amount of evaporative fuel detected by said evaporative fuel amount-detecting means.

6. A control system according to claim 5, wherein said amount of auxiliary air is set to a larger value as said amount of evaporative fuel detected by said evaporative fuel amount-detecting means is larger.

* * * * *